(12) United States Patent
Dang

(10) Patent No.: US 7,730,116 B2
(45) Date of Patent: Jun. 1, 2010

(54) METHOD AND SYSTEM FOR FAST IMPLEMENTATION OF AN APPROXIMATION OF A DISCRETE COSINE TRANSFORM

(75) Inventor: Philip P. Dang, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1047 days.

(21) Appl. No.: 11/128,626

(22) Filed: May 13, 2005

(65) Prior Publication Data

US 2006/0129622 A1    Jun. 15, 2006

Related U.S. Application Data

(60) Provisional application No. 60/635,841, filed on Dec. 14, 2004.

(51) Int. Cl.
*G06F 17/14* (2006.01)

(52) U.S. Cl. ....................................... 708/402
(58) Field of Classification Search .................. 708/402
See application file for complete search history.

(56) References Cited

U.S. PATENT DOCUMENTS

| | | | | |
|---|---|---|---|---|
| 4,791,598 | A * | 12/1988 | Liou et al. | 708/402 |
| 5,285,402 | A * | 2/1994 | Keith | 708/402 |
| 5,477,478 | A * | 12/1995 | Okamoto et al. | 708/402 |
| 5,801,975 | A * | 9/1998 | Thayer et al. | 708/402 |
| 6,460,061 | B1 * | 10/2002 | Dick | 708/401 |
| 7,035,332 | B2 * | 4/2006 | He et al. | 375/240.02 |

* cited by examiner

*Primary Examiner*—David H Malzahn
(74) *Attorney, Agent, or Firm*—Lisa K. Jorgensen; William A. Munck

(57) ABSTRACT

A processor includes a multi-stage pipeline having a plurality of stages. Each stage is capable of receiving input values and providing output values. Each stage performs one of a plurality of data transformations using the input values to produce the output values. The data transformations collectively approximate at least one of: a discrete cosine transform and an inverse discrete cosine transform. The stages do not use any multipliers to perform the data transformations.

21 Claims, 6 Drawing Sheets

METHOD AND SYSTEM FOR FAST IMPLEMENTATION OF AN APPROXIMATION OF A DISCRETE COSINE TRANSFORM

CROSS-REFERENCE TO RELATED APPLICATIONS

This application claims priority under 35 U.S.C. §119(e) to U.S. Provisional Patent Application No. 60/635,841 filed on Dec. 14, 2004, which is hereby incorporated by reference.

TECHNICAL FIELD

This disclosure is generally directed to signal processing systems and more specifically to a method and system for fast implementation of an approximation of a discrete cosine transform.

BACKGROUND

The discrete cosine transform (DCT) is a very useful and important transformation in a wide range of signal processing systems. For example, the discrete cosine transform and its inverse transform (IDCT) are often two of the core operations in audio, image, and video coding systems. These transforms have even been adopted by several international coding standards, such as the Joint Picture Expert Group (JPEG), H.261, H.263, Moving Picture Experts Group 1 (MPEG-1), MPEG-2, and MPEG-4 standards.

Both the discrete cosine transform and its inverse transform involve intensive computational processes. For example, a direct implementation of an eight-point, one-dimensional discrete cosine transform typically involves sixty-four multiplication operations and fifty-six addition operations to convert input data into DCT coefficients. Other implementations of the discrete cosine transform attempt to reduce this complexity. These implementations, often referred to as "Fast DCT" algorithms, typically involve twenty-nine addition operations and between eleven and sixteen multiplication operations.

A problem with these implementations of the discrete cosine transform and its inverse transform is that they involve floating point multiplication operations. Floating point operations are typically slow and require larger areas when implemented in hardware. Also, the longer execution time required for floating point operations typically results in greater power consumption. This may be troublesome in applications such as mobile multimedia devices like digital cameras, videophones, and pocket computers, which often have limited power, processing resources, and memory.

SUMMARY

This disclosure provides a method and system for fast implementation of an approximation of a discrete cosine transform.

In a first embodiment, a processor includes a multi-stage pipeline having a plurality of stages. Each stage is capable of receiving input values and providing output values. Each stage performs one of a plurality of data transformations using the input values to produce the output values. The data transformations collectively approximate at least one of a discrete cosine transform and an inverse discrete cosine transform. The stages do not use any multipliers to perform the data transformations.

In a second embodiment, a multi-dimensional processor includes a plurality of processing units. Each of one or more of the processing units includes a multi-stage pipeline having a plurality of stages. Each stage is capable of receiving input values and providing output values. Each stage performs one of a plurality of data transformations using the input values to produce the output values. The data transformations collectively approximate at least one of a discrete cosine transform and an inverse discrete cosine transform. The stages do not use any multipliers to perform the data transformations. The multi-dimensional processor also includes at least one memory capable of storing intermediate values output by one of the processing units and providing the intermediate values as input to another of the processing units.

In a third embodiment, a method includes receiving an input signal and transforming the input signal into an output signal by performing a sequence of data transformations in a multi-stage pipeline. Each data transformation transforms input values into output values. The data transformations collectively approximate at least one of a discrete cosine transform and an inverse discrete cosine transform. The data transformations are performed in the multi-stage pipeline without using any multipliers.

In a fourth embodiment, a method includes decomposing, into a product of a plurality of matrices, a matrix representing an approximation of at least one of a discrete cosine transform and an inverse discrete cosine transform. The method also includes mapping the plurality of matrices to a plurality of stages of a multi-stage pipeline. Each of the plurality of stages is capable of performing one of a plurality of data transformations. The data transformations collectively approximate at least one of the discrete cosine transform and the inverse discrete cosine transform.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
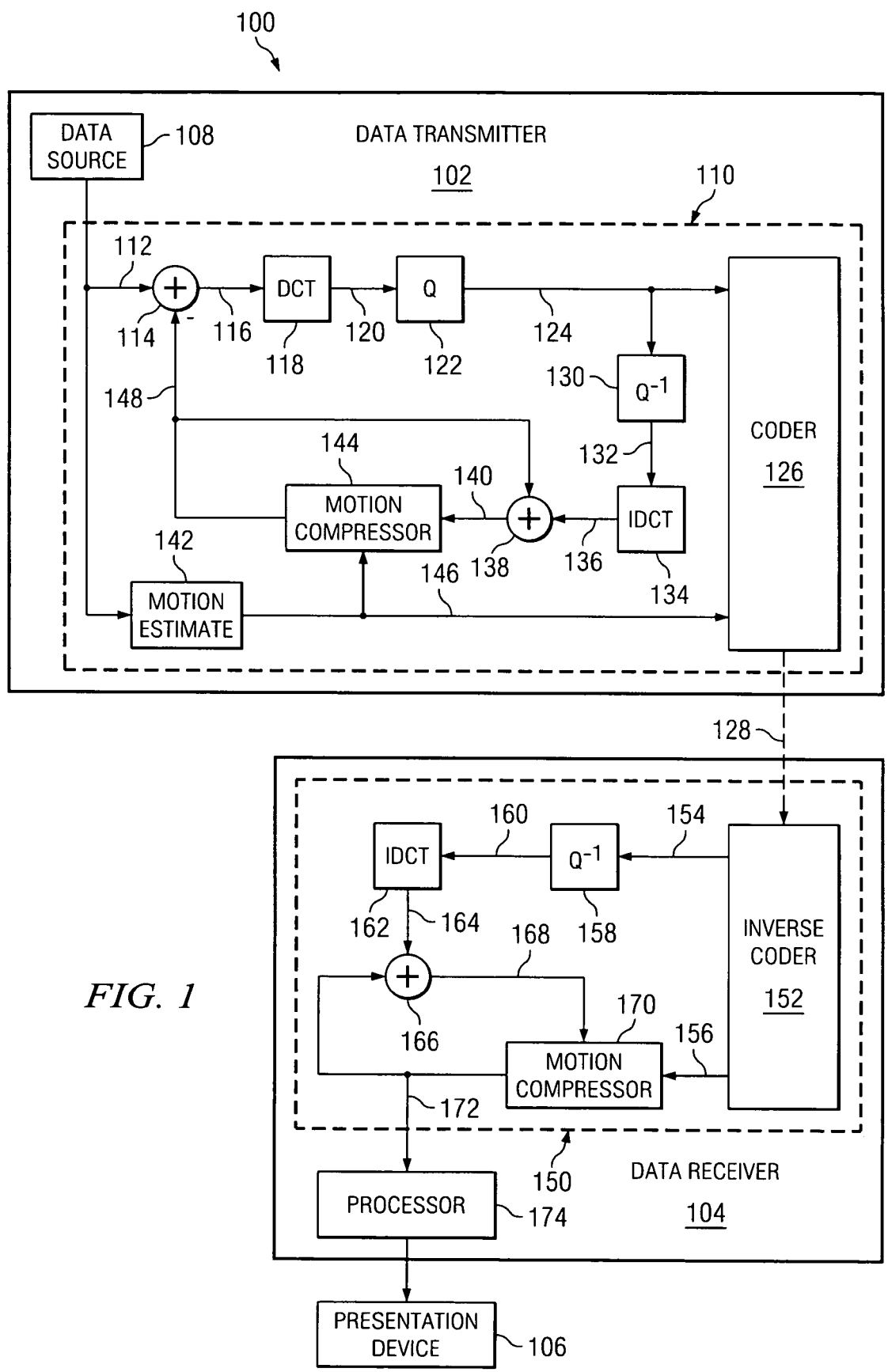
FIG. 1 illustrates an example signal processing system according to one embodiment of this disclosure.

FIG. 1 illustrates an example signal processing system 100 according to one embodiment of this disclosure. In the illustrated example, the system 100 includes a data encoding device 102, a data decoding device 104, and a presentation device 106. The signal processing system 100 shown in FIG. 1 is for illustration only. Other embodiments of the signal processing system 100 may be used without departing from the scope of this disclosure.

In one aspect of operation, the encoding device 102 compresses information, such as video or image data, using an approximation of the discrete cosine transform (DCT) (also referred to as a "forward" discrete cosine transform). The decoding device 104 receives and decompresses the information using an approximation of the inverse discrete cosine transform (IDCT). The encoding device 102 could also use an approximation of the inverse discrete cosine transform to compress the information. The approximation of the discrete cosine transform and its inverse transform used by the encoding device 102 and/or the decoding device 104 represents a lower complexity implementation of the transforms in which coefficients are power-of-two numbers. This lower complexity implementation may be referred to as a "BinDCT" implementation or algorithm. Since coefficients in the transform and inverse transform represent power-of-two numbers, the BinDCT algorithm may be said to implement a "binary" transform or inverse transform.

The BinDCT implementation of the transforms may involve various mathematical operations such as addition and shift operations used to calculate the transforms, without requiring the use of multiplication operations. This helps to reduce the complexity of the BinDCT algorithm and increase the execution speed of the encoding device 102 and/or the decoding device 104. This approach requires less power to be used in devices such as mobile telephones, videophones, digital cameras, and digital camcorders having limited power, processing resources, and memory. The parallel implementations may be used in devices such as high definition television receivers having more power, processing resources, and memory. As a particular example, a proposed system may allow the DCT and IDCT functions to be performed in real-time applications such as video applications using the Common Intermediate Format at a 5MHz clock rate with a 1.55V power supply.

In the illustrated example, the encoding device 102 generates compressed information. The encoding device 102 represents any suitable apparatus, system, or mechanism for producing or otherwise providing compressed information. For example, the encoding device 102 could represent any apparatus, system, or mechanism that provides compressed video or image information. As particular examples, the encoding device 102 could represent a streaming transmitter capable of transmitting streaming video or image information to a decoding device 104 over a network. The network could represent one or more networks, such as the Internet, a digital subscriber line (DSL), a wireless network, a direct broadcast satellite (DBS) system, a multimedia services over packet network (MSPN), or a cable television (CATV) network. The encoding device 102 could also represent an optical disc burner capable of storing compressed video or image information on a digital versatile disc (DVD), compact disc (CD), or other optical medium. The encoding device 102 could further represent a digital recorder capable of compressing video or image information for storage on a hard disk drive or other magnetic storage medium. The encoding device 102 includes any hardware, software, firmware, or combination thereof for compressing information.

The decoding device 104 decompresses the compressed information provided by the encoding device 102. The decoding device 104 represents any suitable apparatus, system, or mechanism for decompressing information. For example, the decoding device 104 could represent a streaming receiver capable of receiving streaming video or image information from the encoding device 102 over a network. The decoding device 104 could also represent an optical disc player capable of retrieving compressed information from an optical disc. The decoding device 104 could further represent a digital recorder capable of decompressing information stored on a hard disk drive. The decoding device 104 includes any hardware, software, firmware, or combination thereof for decompressing information.

In the illustrated example, the decoding device 104 decompresses the compressed information and provides the decompressed information to a presentation device 106 for presentation to a user. The presentation device 106 represents any suitable device, system, or structure for presenting information to one or more users. The presentation device 106 could, for example, include an audio device such as a speaker or audio playback system. The presentation device 106 could also include a visual device such as a television, computer monitor, or projector. The decoding device 104 could provide the decompressed information to any other or additional destination(s).

While shown in FIG. 1 as separate components, the encoding device 102 and the decoding device 104 could operate within a single device or apparatus. For example, the encoding device 102 and the decoding device 104 could operate within a digital recorder (such as a digital video recorder or DVR) or other device. The encoding device 102 could receive and compress video or image information for storage on a hard disk drive, and the decoding device 104 could retrieve and decompress the information for presentation.

In this example, the encoding device 102 includes a data source 108 and an encoder 110. The data source 108 provides a data signal 112 containing information to be compressed by the encoding device 102. The data source 108 represents any device, system, or structure capable of generating or otherwise providing uncompressed information. The data source 108 could, for example, include a video or image source such as a television receiver (such as terrestrial broadcast, cable, or satellite receiver), a digital camera, a digital camcorder, a storage device storing raw video data, or other source of video information. The data source 108 could also represent a combined audio, video, and/or image source providing multiple forms of data. While FIG. 1 illustrates the data source 108 as forming part of the encoding device 102, the data source 108 could also reside outside of the encoding device 102.

The encoder 110 uses approximations of the discrete cosine transform and its inverse transform to compress the information from the data source 108. In this particular example, the encoder 110 is arranged to compress video information. However, other embodiments of the encoder 110 used to compress other or additional types of information may be used in the encoding device 102.

In this example, a combiner 114 is coupled to the data source 108. In this document, the term "couple" and its derivatives refer to any direct or indirect communication between two or more elements, whether or not those elements are in physical contact with one another. The combiner 114 receives the data signal 112 containing uncompressed information from the data source 108. The combiner 114 also receives a feedback signal 148 from other components in the encoder 110. The feedback signal 148 is associated with information that has already been compressed by the encoder 110. The combiner 114 identifies any differences between the data signal 112 and the feedback signal 148. The combiner 114 then outputs the identified differences as a residual signal 116. The combiner 114 represents any hardware, software, firmware, or combination thereof for combining signals, such as a subtractor.

The residual signal 116 is provided to a discrete cosine transform unit (DCT) 118. The discrete cosine transform unit 118 processes the residual signal 116 by implementing an approximation of the discrete cosine transform to convert the residual signal 116 (which is in the spatial domain) into frequency domain coefficients. The discrete cosine transform unit 118 then outputs DCT coefficients 120. The discrete cosine transform unit 118 includes any hardware, software, firmware, or combination thereof for transforming information into DCT coefficients.

The DCT coefficients 120 are provided to a quantizer (Q) 122. The quantizer 122 quantizes the DCT coefficients 120. For example, the quantizer 122 could divide the DCT coefficients 120 by one or more values to produce quantized DCT coefficients 124. The quantizer 122 includes any hardware, software, firmware, or combination thereof for quantizing DCT coefficients.

The quantized DCT coefficients 124 are provided to a coder 126. The coder 126 encodes the quantized DCT coefficients 124 (possibly with other information) to produce compressed information 128. The coder 126 may implement any suitable encoding technique to compress the quantized DCT coefficients 124. The coder 126 includes any hardware, software, firmware, or combination thereof for encoding quantized DCT coefficients 124.

As noted above, in this example embodiment, the encoder 110 is arranged to compress video information. To support the compression of video information, the encoder 110 includes an inverse quantizer ($Q^{-1}$) 130. The inverse quantizer 130 processes the quantized DCT coefficients 124 and attempts to reverse the processing performed by the quantizer 122. For example, the inverse quantizer 130 could implement an inverse quantization function to produce DCT coefficients 132. As a particular example, the inverse quantizer 130 could multiply the quantized DCT coefficients 124 by one or more values to produce the DCT coefficients 132. The DCT coefficients 132 may be the same as or similar to the original DCT coefficients 120. The inverse quantizer 130 includes any hardware, software, firmware, or combination thereof for performing an inverse quantization function.

The DCT coefficients 132 are provided to an inverse discrete cosine transform unit (IDCT) 134. The inverse discrete cosine transform unit 134 processes the DCT coefficients 132 and attempts to reverse the processing performed by the discrete cosine transform unit 118. For example, the inverse discrete cosine transform unit 134 could implement an approximation of the inverse discrete cosine transform to produce a residual signal 136 using the DCT coefficients 132. The residual signal 136 might match the original residual signal 116, or the residual signal 136 may be similar to the residual signal 116 but have some differences. The inverse discrete cosine transform unit 134 includes any hardware, software, firmware, or combination thereof for implementing an inverse discrete cosine transform.

The residual signal 136 is provided to a combiner 138. The combiner 138 also receives the feedback signal 148. The combiner 138 combines the residual signal 136 and the feedback signal 148 to produce a reconstructed signal 140. The combiner 138 represents any hardware, software, firmware, or combination thereof for combining signals, such as an adder.

A motion estimator 142 receives the original data signal 112 from the data source 108. The reconstructed signal 140 is provided to a motion compensator 144. The motion estimator 142 uses the received information to identify motion within video images being compressed. For example, the motion estimator 142 could implement field-based or frame-based motion estimation to identify motion. The motion estimator 142 then outputs motion vectors 146, which represent the identified motion in the video images. The motion vectors 146 are provided to the coder 126 for coding as part of the compressed information 128. The motion vectors 146 are also provided to the motion compensator 144. The motion estimator 142 includes any hardware, software, firmware, or combination thereof for estimating motion in video images.

The motion compensator 144 receives the reconstructed signal 140 and the motion vectors 146. The motion compensator 144 uses the motion vectors 146 to alter the reconstructed signal 140 and re-introduce motion into the reconstructed signal 140. This produces the feedback signal 148, which may or may not match the original data signal 112. The motion compensator 144 includes any hardware, software, firmware, or combination thereof for altering video information to introduce motion into video images.

As shown in FIG. 1, the decoding device 104 includes a decoder 150. The decoder 150 includes an inverse coder 152. The inverse coder 152 implements an inverse of the coding function used by the coder 126 in the encoding device 102. In the example in FIG. 1, the inverse coder 152 receives compressed information 128 and separates quantized DCT coefficients 154 and motion vectors 156. The inverse coder 152 includes any hardware, software, firmware, or combination thereof for decoding quantized DCT coefficients.

The quantized DCT coefficients 154 are provided to an inverse quantizer 158, which produces DCT coefficients 160. An inverse discrete cosine transform unit 162 receives the DCT coefficients 160 and generates a residual signal 164. A combiner 166 combines the residual signal 164 with an output signal 172 to produce a reconstructed signal 168. A motion compensator 170 uses the reconstructed signal 168 and the motion vectors 156 to generate the output signal 172. The output signal 172 is provided to a processor 174 for processing before presentation to a user. The various components 158, 162, 166, 170 in the decoder 150 may be the same as or similar to the components 130, 134, 138, 144 in the encoder 110. The processor 174 represents any processor capable of preparing decompressed information for presentation to a user. As an example, if the decompressed information includes video information, the processor 174 could represent a video processor capable of formatting the video information for presentation on a display device.

In some embodiments, the discrete cosine transform unit 118, the inverse discrete cosine transform unit 134, and/or the inverse discrete cosine transform unit 162 uses the "BinDCT" implementation of the discrete cosine transform or its inverse transform. This allows the transform units 118, 134, 162 to perform various operations to approximate the appropriate transform without requiring the use of floating point multiplication operations. This helps to reduce the complexity of the transform units 118, 134, 162 and increase the execution speed of the encoding device 102 and/or the decoding device 104. Also, the accuracy of the approximation provided by the BinDCT algorithm may be varied depending on the application. This may allow, for example, suitable implementations to be used in lower power applications and higher performance applications.

Although FIG. 1 illustrates one example of a signal processing system 100, various changes may be made to FIG. 1. For example, FIG. 1 illustrates one example embodiment of the encoding device 102 and one example embodiment of the decoding device 104. Other embodiments of the encoding device 102 and/or the decoding device 104 may be used. Also, the encoding device 102 and the decoding device 104 could be combined into a single device or apparatus. Further, the encoder 110 and the decoder 150 are illustrated as containing various components used for video compression (such as motion estimator 142 and motion compensators 144, 170). These components need not be used if the system 100 is not transmitting video information. In addition, the functional division shown in FIG. 1 is for illustration only. Various components in FIG. 1 may be combined or omitted and additional components could be added according to particular needs.

Figure 2:
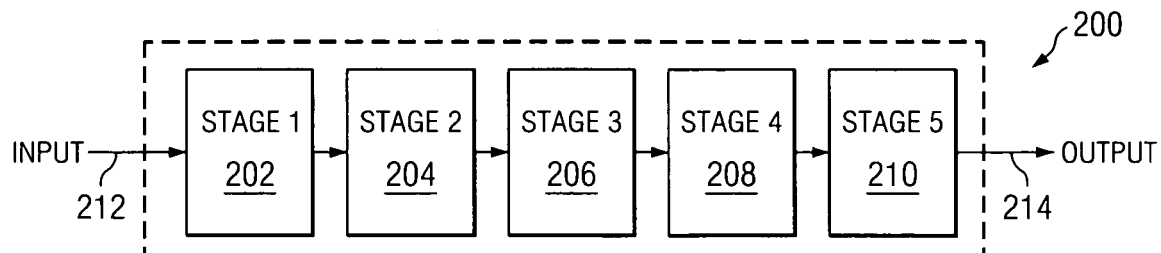
FIG. 2 illustrates an example pipelined one-dimensional discrete cosine transform processor according to one embodiment of this disclosure.

FIG. 2 illustrates an example pipelined one-dimensional (1-D) discrete cosine transform (DCT) processor 200 according to one embodiment of this disclosure. The embodiment of the 1-D DCT processor 200 shown in FIG. 2 is for illustration only. Other embodiments of the 1-D DCT processor 200 may be used without departing from the scope of this disclosure. Also, the 1-D DCT processor 200 could be used as part of the transform units 118, 134, 162 shown in FIG. 1 to implement an approximation of the discrete cosine transform or its inverse transform. The 1-D DCT processor 200 could be used in any other suitable device or apparatus.

In some embodiments, the structure of the BinDCT algorithm may be represented in matrix form as:

$$BinDCT = \begin{bmatrix} 1/2 & 1/2 & 1/2 & 1/2 & 1/2 & 1/2 & 1/2 & 1/2 \\ 1/2 & 1/2 & 3/16 & 0 & 0 & 3/16 & -1/2 & 1-/2 \\ 55/128 & 3/16 & -3/16 & -55/128 & -55/128 & -3/16 & 3/16 & 55/128 \\ 9/32 & -1/8 & -19/64 & -1/4 & 1/4 & 19/64 & 1/8 & -9/32 \\ 1/4 & -1/4 & -1/4 & 1/4 & 1/4 & -1/4 & -1/4 & 1/4 \\ 7/16 & -3/4 & 7/32 & 1/2 & -1/2 & -7/32 & 3/4 & -7/16 \\ -3/16 & 1/2 & -1/2 & 3/16 & 3/16 & -1/2 & 1/2 & -3/16 \\ -1/16 & 1/4 & -13/32 & 1/2 & -1/2 & 13/32 & -1/4 & 1/16 \end{bmatrix} \quad (1)$$

To implement the BinDCT algorithm, the BinDCT structure is decomposed into simpler matrices. For example, the BinDCT structure is decomposed into five matrices as shown in the following equation:

$$BinDCT = \frac{1}{2} E \cdot D \cdot C \cdot B \cdot A. \quad (2)$$

In this equation, A, B, C, D, and E represent matrices, which are implemented in five stages 202-210 of the 1-D DCT processor 200. In particular embodiments, these matrices are defined as follows:

$$A = \begin{bmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 0 & 0 & 0 & 1 & -1 & 0 & 0 & 0 \\ 0 & 0 & 1 & 0 & 0 & -1 & 0 & 0 \\ 0 & 1 & 0 & 0 & 0 & 0 & -1 & 0 \\ 1 & 0 & 0 & 0 & 0 & 0 & 0 & -1 \end{bmatrix} \quad (3)$$

$$B = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & -49/64 & 5/8 & 0 \\ 0 & 0 & 0 & 0 & 0 & 3/8 & 1 & 0 \\ 0 & 0 & 0 & 0 & 0 & 0 & 0 & 1 \end{bmatrix} \quad (4)$$

$$C = \begin{bmatrix} 1 & 0 & 0 & 1 & 0 & 0 & 0 & 0 \\ 0 & 1 & 1 & 0 & 0 & 0 & 0 & 0 \\ 0 & 1 & -1 & 0 & 0 & 0 & 0 & 0 \\ 1 & 0 & 0 & -1 & 0 & 0 & 0 & 0 \\ 0 & 0 & 0 & 0 & 1 & 1 & 0 & 0 \\ 0 & 0 & 0 & 0 & 1 & -1 & 0 & 0 \\ 0 & 0 & 0 & 0 & 0 & 0 & -1 & 1 \\ 0 & 0 & 0 & 0 & 0 & 0 & 1 & 1 \end{bmatrix} \quad (5)$$

-continued $$D = \begin{bmatrix} 1 & 1 & 0 & 0 & 0 & 0 & 0 & 0 \\ 1/2 & -1/2 & 0 & 0 & 0 & 0 & 0 & 0 \\ 0 & 0 & 1 & -3/8 & 0 & 0 & 0 & 0 \\ 0 & 0 & 3/8 & 55/64 & 0 & 0 & 0 & 0 \\ 0 & 0 & 0 & 0 & 1 & 0 & 0 & -1/8 \\ 0 & 0 & 0 & 0 & 0 & 1 & 7/8 & 0 \\ 0 & 0 & 0 & 0 & 0 & -1/2 & 9/16 & 0 \\ 0 & 0 & 0 & 0 & 0 & 0 & 0 & 1 \end{bmatrix} \quad (6)$$

-continued $$E = \begin{bmatrix} 1 & 0 & 0 & 0 & 0 & 0 & 0 & 0 \\ 0 & 0 & 0 & 0 & 0 & 0 & 0 & 1 \\ 0 & 0 & 0 & 1 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 1 & 0 & 0 & 0 \end{bmatrix}. \quad (7)$$

Other decompositions of the BinDCT structure shown in Equation (1) could also be used.

As shown in FIG. 2, in order to achieve a high system throughput, the BinDCT decomposition is implemented as a linear multi-stage pipeline. In this example, the 1-D DCT processor 200 includes five stages 202-210. The first stage 202 receives an input signal 212 containing information to be converted into DCT coefficients (such as pixel data), and the DCT coefficients are provided as an output signal 214 from the last stage 210. In this example, the stages 202-210 enable the 1-D DCT processor 200 to act as a pipelined processor capable of processing multiple sets of input data simultaneously.

Each matrix A, B, C, D, and E shown above is associated with one of the stages 202-210 in the 1-D DCT processor 200. In particular embodiments, the first four stages 202-208 perform the forward BinDCT transformation, while the last stage 210 reorders the data values for output in the output signal 214. Embodiments of the five stages 202-210 implementing the BinDCT decomposition are shown in FIGS. 3 through 7, which are described below.

In particular embodiments, let $X_0$-$X_7$ represent eight input values contained in the input signal 212, let $A_0$-$A_7$ represent eight values produced by the first stage 202, and let $B_0$-$B_7$ represent eight values produced by the second stage 204. Similarly, let $C_0$-$C_7$ represent eight values produced by the third stage 206, let $D_0$-$D_7$ represent eight values produced by the fourth stage 208, and let $E_0$-$E_7$ represent eight values produced by the last stage 210. The architecture of the various stages 202-210 described below may be summarized as follows:

Stage 1

$A_0 = X_0 + X_7 \quad A_1 = X_1 + X_6 \quad A_2 = X_2 + X_5 \quad A_3 = X_3 + X_4$
$A_4 = X_3 - X_4 \quad A_5 = X_2 - X_5 \quad A_6 = X_1 - X_6 \quad A_7 = X_0 - X_7$ Stage 2

$B_0 = A_0 \quad B_1 = A_1 \quad B_2 = A_2 \quad B_3 = A_3$
$B_4 = A_4 \quad B_5 = \frac{5}{8}A_6 - \frac{49}{64}A_5 \quad B_6 = \frac{3}{8}A_5 + A_6 \quad B_7 = A_7$ Stage 3

$C_0 = B_0 + B_3 \quad C_1 = B_1 + B_2 \quad C_2 = B_1 - B_2 \quad C_3 = B_0 - B_3$
$C_4 = B_4 - B_5 \quad C_5 = B_4 - B_5 \quad C_6 = B_7 - B_6 \quad C_7 = B_6 + B_7$ Stage 4

$D_0 = C_0 + C_1 \quad D_1 = \frac{(C_0 - C_1)}{2} \quad D_2 = C_2 - \frac{3C_3}{8} \quad D_3 = \frac{3C_2}{8} + \frac{55C_3}{64}$
$D_4 = C_4 - \frac{C_7}{8} \quad D_5 = C_5 + \frac{7C_6}{8} \quad D_6 = \frac{9C_6}{16} - \frac{C_5}{2} \quad D_7 = C_7$ -continued Stage 5

$E_0 = D_0 \quad E_1 = D_7 \quad E_2 = D_3 \quad E_3 = D_6$
$E_4 = D_1 \quad E_5 = D_5 \quad E_6 = D_2 \quad E_7 = D_4$ For lower power applications, the stages 202-206 could each include a single adder. In particular embodiments, the computations in each of the stages 202-206 uses eight clock cycles. To balance the latency, two adders are used in the fourth stage 208, and the last stage 210 does not perform any arithmetic operations. As a result, the lower power design of the stages 202-210 uses five adders and forty registers (which store the eight values used in each stage). In higher performance applications, additional adders could be used in each of the stages 202-208, and the fifth stage 210 may be omitted.

The parameters in the A, B, C, D, and E matrices represent values to the power of two. Because of this, multiplications may be performed using shift-add operations in the 1-D DCT processor 200. In particular embodiments, control signals used in the stages 202-208 may be set locally in each of the stages 202-208, and additions and subtractions are calculated using two's complement arithmetic.

Figure 3:
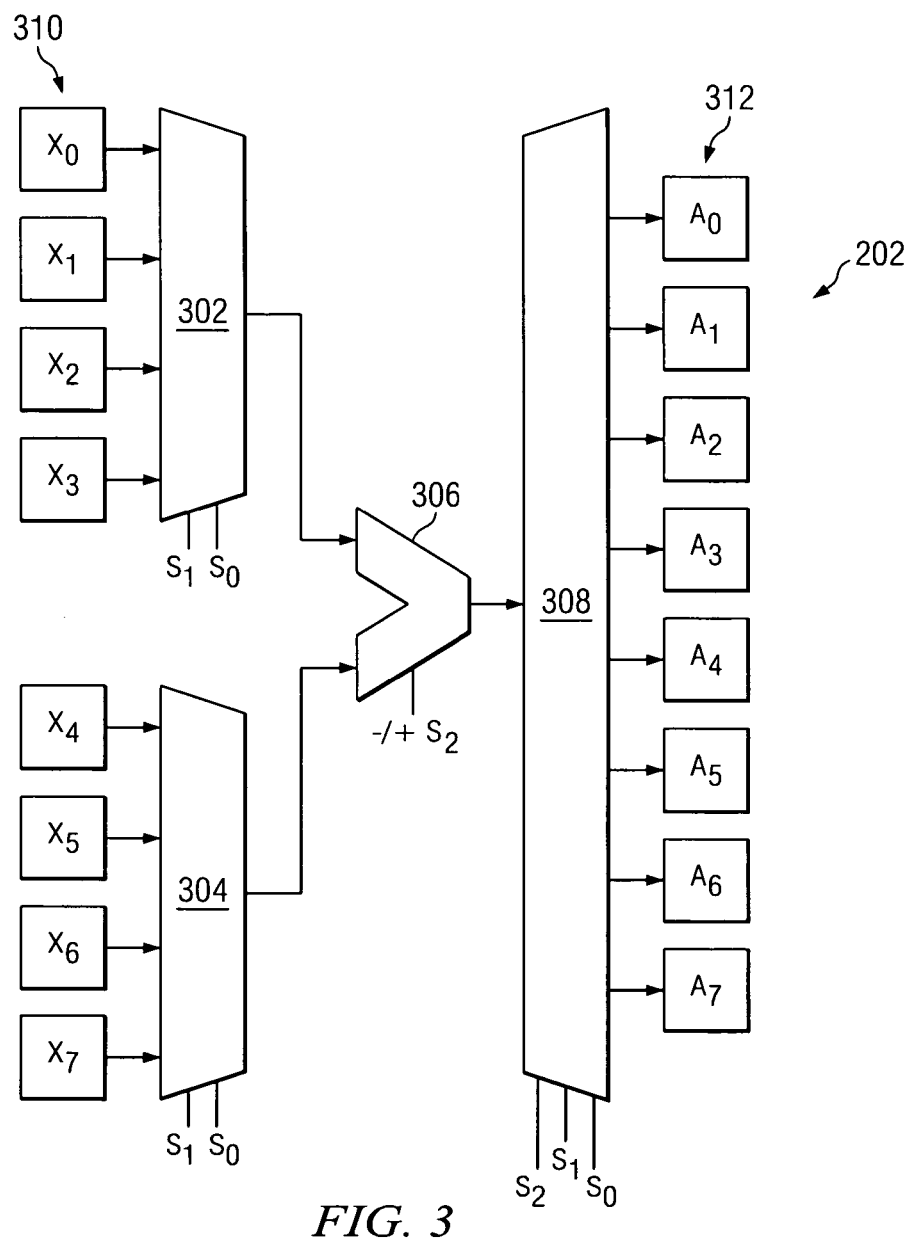
FIG. 3 illustrates an example first stage in a pipelined one-dimensional discrete cosine transform processor according to one embodiment of this disclosure.

FIG. 3 illustrates an example first stage 202 in a pipelined 1-D DCT processor 200 according to one embodiment of this disclosure. The embodiment of the first stage 202 shown in FIG. 3 is for illustration only. Other embodiments of the first stage 202 may be used without departing from the scope of this disclosure.

The first stage 202 is associated with matrix A in Equation (3). As shown in FIG. 3, the first stage 202 includes two multiplexers 302-304, an adder 306, and a demultiplexer 308. Each of the multiplexers 302-304 is capable of receiving multiple input values and selecting and outputting one of the values as an output. For example, each of the multiplexers 302-304 could receive four input values (a subset of all input values) and select one of the input values for output. Each of the multiplexers 302-304 includes any hardware, software, firmware, or combination thereof for receiving multiple input values and outputting selected values, such as four-to-one multiplexers.

The adder 306 is coupled to the multiplexer 302-304 and the demultiplexer 308. The adder 306 is capable of adding or subtracting two input values received at inputs of the adder 306. The adder 306 then generates an output value representing the sum or difference between the two input values. The adder 306 includes any hardware, software, firmware, or combination thereof for adding and subtracting values. The adder 306 could, for example, represent an eight-bit integer adder.

The demultiplexer 308 is capable of receiving one input value and outputting the value to one of multiple destinations. For example, the demultiplexer 308 could receive one value produced by the adder 306 and select one of eight destinations for the value. The demultiplexer 308 includes any hardware, software, firmware, or combination thereof for receiving an input value and providing the value to one of multiple destinations, such as a one-to-eight demultiplexer.

In this example, each of the multiplexers 302-304 receives two control signals denoted $S_0$ and $S_1$. The control signals $S_0$ and $S_1$ control which input value is output by the multiplexers 302 -304. The adder 306 is controlled by a control signal denoted $S_2$. The control signal $S_2$ controls whether the adder 306 performs an addition or subtraction operation. The demultiplexer 308 is controlled by the three control signals denoted $S_0$, $S_1$, and $S_2$, which identify the destination of a value output by the demultiplexer 308. In particular embodiments, the adder 306 performs addition operations during an initial four clock cycles and subtraction operations in the following four clock cycles. Also, the multiplexers 302-304 output values to the adder 306 each clock cycle, and the demultiplexer 308 distributes the output of the adder 306 to one of eight destinations each clock cycle.

As shown in FIG. 3, the first stage 202 receives eight input values $X_0$-$X_7$ and produces eight output values $A_0$-$A_7$. In this example, the eight input values $X_0$-$X_7$ are stored in eight registers 310, and the eight output values $A_0$-$A_7$ are stored in eight registers 312. The registers 310-312 include any hardware, software, firmware, or combination thereof for storing values. The registers 310-312 may or may not actually form part of the first stage 202 in the 1-D DCT processor 200.

As noted above, the function of the first stage 202 is controlled by the control signals $S_0$, $S_1$, and $S_2$. The operation of the stage 202 is summarized in Table 1.

TABLE 1

| $S_2$ | $S_1$ | $S_0$ | Function |
|---|---|---|---|
| 0 | 0 | 0 | $A_0 = X_0 + X_7$ |
| 0 | 0 | 1 | $A_1 = X_1 + X_6$ |
| 0 | 1 | 0 | $A_2 = X_2 + X_5$ |
| 0 | 1 | 1 | $A_3 = X_3 + X_4$ |
| 1 | 0 | 0 | $A_4 = X_0 - X_7$ |
| 1 | 0 | 1 | $A_5 = X_1 - X_6$ |
| 1 | 1 | 0 | $A_6 = X_2 - X_5$ |
| 1 | 0 | 1 | $A_7 = X_3 - X_4$ |

Figure 4:
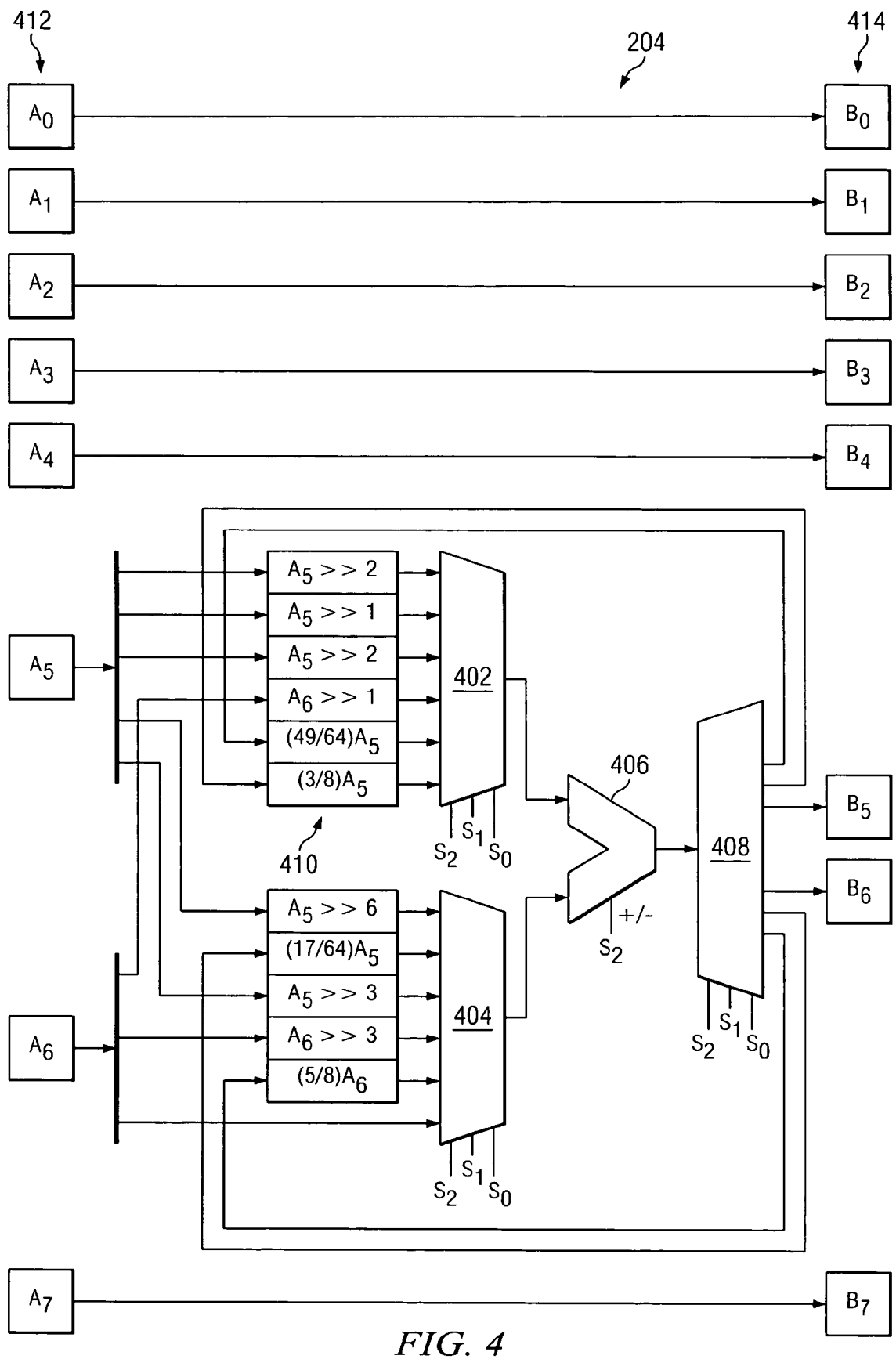
FIG. 4 illustrates an example second stage in a pipelined one-dimensional discrete cosine transform processor according to one embodiment of this disclosure.

FIG. 4 illustrates an example second stage 204 in a pipelined 1-D DCT processor 200 according to one embodiment of this disclosure. The embodiment of the second stage 204 shown in FIG. 4 is for illustration only. Other embodiments of the second stage 204 may be used without departing from the scope of this disclosure.

The second stage 204 is associated with matrix B in Equation (4). As shown in FIG. 4, the second stage 204 includes two multiplexers 402-404, an adder 406, a demultiplexer 408, and a register bank 410. Each of the multiplexers 402-404 is capable of receiving multiple input values and selecting and outputting one of the values as an output. For example, each of the multiplexers 402-404 could receive six values from the register bank 410 and select one of the values for output. Each of the multiplexers 402-404 includes any hardware, software, firmware, or combination thereof for receiving multiple input values and outputting selected values, such as eight-to-one multiplexers.

The adder 406 is coupled to the multiplexer 402-404 and the demultiplexer 408. The adder 406 is capable of adding or subtracting two values received at inputs of the adder 406. The adder 406 then generates an output value representing the sum or difference between the two input values. The adder 406 includes any hardware, software, firmware, or combination thereof for adding and subtracting values. The adder 406 could, for example, represent a nine-bit integer adder.

The demultiplexer 408 is capable of receiving one input value and outputting the value to one of multiple destinations. For example, the demultiplexer 408 could receive one input value from the adder 406 and select one of six destinations for the value. The demultiplexer 408 includes any hardware, software, firmware, or combination thereof for receiving an input value and providing the input value to one of multiple destinations, such as a one-to-eight demultiplexer. In the illustrated example, the demultiplexer 408 distributes the output of the adder 406 to one of six destinations. Two of the destinations represent outputs of the second stage 204. The four other destinations represent registers in the register bank 410.

The register bank 410 includes one or more registers capable of storing data values used by the second stage 204. For example, two input values (denoted $A_5$ and $A_6$) may be shifted and stored in the register bank 410. Also, several outputs of the adder 406 may be stored in the register bank 410. The register bank 410 includes any hardware, software, firmware, or combination thereof for storing values.

In this example, each of the multiplexers 402-404 receives three control signals denoted $S_0$, $S_1$, and $S_2$. These control signals control which input value is output by the multiplexers 402-404. The adder 406 is controlled by the control signal denoted $S_2$. The control signal $S_2$ controls whether the adder 406 performs an addition or subtraction operation. The demultiplexer 408 is controlled by the three control signals denoted $S_0$, $S_1$, and $S_2$, which identify the destination of a value output by the demultiplexer 408. In particular embodiments, the multiplexers 402-404 output values to the adder 406 each clock cycle, and the demultiplexer 408 distributes the output of the adder 406 to one of six destinations each clock cycle.

As shown in FIG. 4, the second stage 204 receives eight input values $A_0$-$A_7$ and produces eight output values $B_0$-$B_7$. In this example, the eight input values $A_0$-$A_7$ are stored in eight registers 412, and the eight output values $B_0$-$B_7$ are stored in eight registers 414. The registers 412-414 include any hardware, software, firmware, or combination thereof for storing values. The registers 412-414 may or may not actually form part of the second stage 204 in the 1-D DCT processor 200. Also, in some embodiments, the registers 412 in FIG. 4 could represent the same registers 312 shown in FIG. 3.

In particular embodiments, the second stage 204 uses six clock cycles to calculate the output values $B_5$ and $B_6$. The output values $B_0$ through $B_4$ and $B_7$ represent the input values $A_0$ through $A_4$ and $A_7$, respectively. If eight clock cycles are provided to the second stage 204 to process each set of input data values, the last two clock cycles are not used.

The function of the second stage 204 is controlled by the control signals $S_0$, $S_1$, and $S_2$. The operation of the second stage 204 is summarized in Table 2.

TABLE 2

| $S_2$ | $S_1$ | $S_0$ | Function |
|---|---|---|---|
| 0 | 0 | 0 | $T_0 = (1/4)A_5 + (1/64)A_5 = (17/64)A_5$ |
| 0 | 0 | 1 | $T_1 = (17/64)A_5 + (1/2)A_5 = (49/64)A_5$ |
| 0 | 1 | 0 | $T_2 = (1/4)A_5 + (1/8)A_5 = (3/8)A_5$ |
| 0 | 1 | 1 | $T_3 = (1/2)A_6 + (1/8)A_6 = (5/8)A_6$ |
| 1 | 0 | 0 | $B_5 = (5/8)A_6 - (49/64)A_5$ |
| 1 | 0 | 1 | $B_6 = A_6 - (3/8)A_5$ |
| 1 | 1 | 0 | — |
| 1 | 0 | 1 | — |

In Table 2, the values $T_0$ through $T_3$ represent intermediate values produced by the adder 406 and stored in the register bank 410. The intermediate values are then used by the adder 406 to generate the output values $B_5$ and $B_6$.

Figure 5:
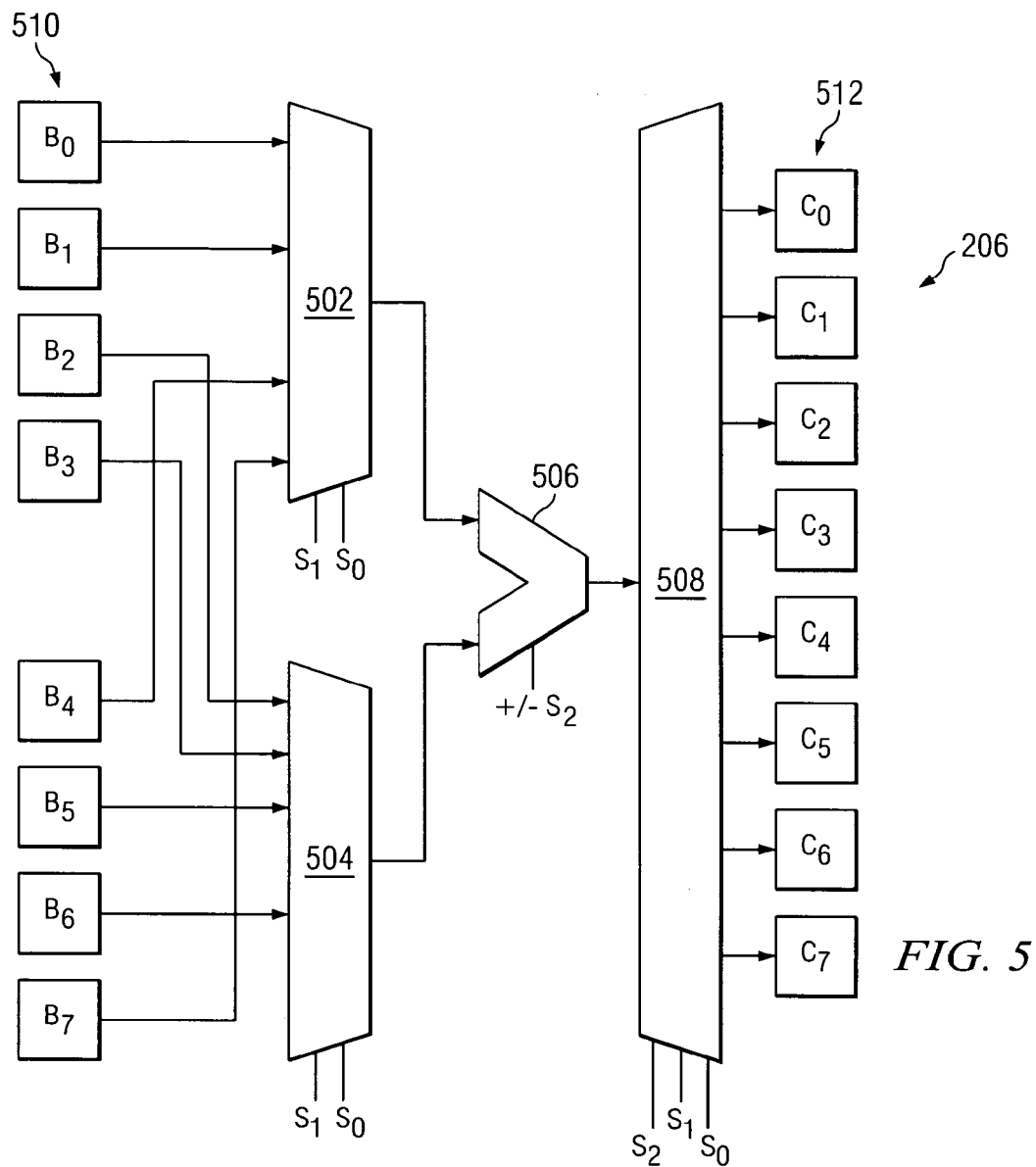
FIG. 5 illustrates an example third stage in a pipelined one-dimensional discrete cosine transform processor according to one embodiment of this disclosure.

FIG. 5 illustrates an example third stage 206 in a pipelined 1-D DCT processor 200 according to one embodiment of this disclosure. The embodiment of the third stage 206 shown in FIG. 5 is for illustration only. Other embodiments of the third stage 206 may be used without departing from the scope of this disclosure.

The third stage 206 is associated with matrix C in Equation (5). As shown in FIG. 5, the third stage 206 includes two multiplexers 502-504, an adder 506, and a demultiplexer 508. Each of the multiplexers 502-504 is capable of receiving multiple input values and selecting and outputting one of the values as an output. Each of the multiplexers 502-504 includes any hardware, software, firmware, or combination thereof for receiving multiple input values and outputting selected values, such as four-to-one multiplexers.

The adder 506 is coupled to the multiplexer 502-504 and the demultiplexer 508. The adder 506 is capable of adding or subtracting two values received at inputs of the adder 506. The adder 506 then generates an output value representing the sum or difference between the two input values. The adder 506 includes any hardware, software, firmware, or combination thereof for adding and subtracting values. The adder 506 could, for example, represent a ten-bit integer adder.

The demultiplexer 508 is capable of receiving one input value and outputting the value to one of multiple destinations. For example, the demultiplexer 508 could receive one input value and select one of eight destinations for the value. The demultiplexer 508 includes any hardware, software, firmware, or combination thereof for receiving an input value and providing the input value to one of multiple destinations, such as a one-to-eight demultiplexer.

Each of the multiplexers 502-504 receives two control signals denoted $S_0$ and $S_1$. The operation of the adder 506 is controlled by a third control signal denoted $S_2$. In particular embodiments, the adder 506 performs addition operations during an initial four clock cycles and subtraction operations in the following four clock cycles. The demultiplexer 508 is controlled by the three control signals.

As shown in FIG. 5, the third stage 206 receives eight input values $B_0$-$B_7$ and produces eight output values $C_0$-$C_7$. In this example, the eight input values $B_0$-$B_7$ are stored in eight registers 510, and the eight output values $C_0$-$C_7$ are stored in eight registers 512. The registers 510-512 include any hardware, software, firmware, or combination thereof for storing values. The registers 510-512 may or may not actually form part of the third stage 206 in the 1-D DCT processor 200. Also, in some embodiments, the registers 510 in FIG. 5 could represent the same registers 414 shown in FIG. 4.

The function of the third stage 206 is controlled by the control signals $S_0$, $S_1$, and $S_2$. The operation of the third stage 206 is shown in Table 3.

TABLE 3

| $S_2$ | $S_1$ | $S_0$ | Function |
|---|---|---|---|
| 0 | 0 | 0 | $C_0 = B_0 + B_3$ |
| 0 | 0 | 1 | $C_1 = B_1 + B_2$ |
| 0 | 1 | 0 | $C_4 = B_4 + B_5$ |
| 0 | 1 | 1 | $C_7 = B_6 + B_7$ |
| 1 | 0 | 0 | $C_3 = B_0 - B_3$ |
| 1 | 0 | 1 | $C_2 = B_1 - B_2$ |
| 1 | 1 | 0 | $C_5 = B_4 - B_5$ |
| 1 | 0 | 1 | $C_6 = B_7 - B_6$ |

Figure 6:
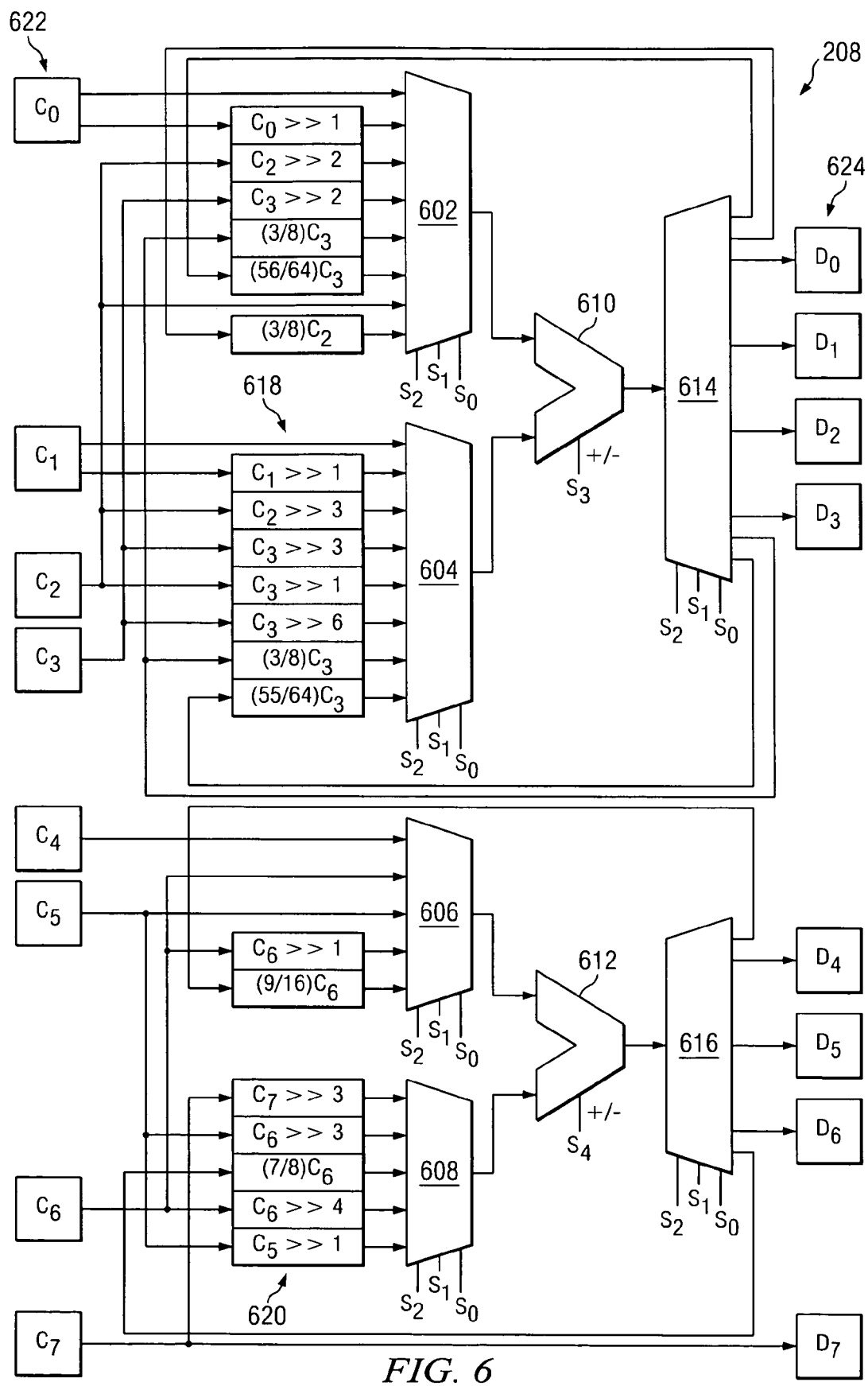
FIG. 6 illustrates an example fourth stage in a pipelined one-dimensional discrete cosine transform processor according to one embodiment of this disclosure.

FIG. 6 illustrates an example fourth stage 208 in a pipelined 1-D DCT processor 200 according to one embodiment of this disclosure. The embodiment of the fourth stage 208 shown in FIG. 6 is for illustration only. Other embodiments of the fourth stage 208 may be used without departing from the scope of this disclosure.

The fourth stage 208 is associated with matrix D in Equation (6). As shown in FIG. 6, the fourth stage 208 includes four multiplexers 602-608, two adders 610-612, two demultiplexers 614-616, and two register banks 618-620. Each of the multiplexers 602-608 is capable of receiving multiple input values and selecting and outputting one of the values as an output. Each of the multiplexers 602-608 includes any hardware, software, firmware, or combination thereof for receiving multiple input values and outputting selected values, such as eight-to-one multiplexers.

Each of the adders 610-612 is coupled to two of the multiplexers 602-608 and to one of the demultiplexers 614-616. Each of the adders 610-612 is capable of adding or subtracting two values received at inputs of the adders 610-612. Each of the adders 610-612 then generates an output value representing the sum or difference between the two input values. Each of the adders 610-612 includes any hardware, software, firmware, or combination thereof for adding and subtracting values. Each of the adders 610-612 could, for example, represent an eleven-bit integer adder.

Each of the demultiplexers 614-616 is capable of receiving one input value and outputting the value to one of multiple destinations. Each of the demultiplexers 614-616 includes any hardware, software, firmware, or combination thereof for receiving an input value and providing the input value to one of multiple destinations, such as one-to-eight demultiplexers.

Each of the register banks 618-620 includes one or more registers capable of storing data values used by the fourth stage 208. For example, the input values $C_0$-$C_3$ may be shifted and stored in the register bank 618, and the input values $C_5$-$C_7$ may be shifted and stored in the register bank 620. Also, outputs of the adders 610-612 may be stored in the register banks 618-620. Each of the register banks 618-620 includes any hardware, software, firmware, or combination thereof for storing values.

In this example, the multiplexers 602-608 receive three control signals denoted $S_0$, $S_1$, and $S_2$. The adders 610-612 are controlled by fourth and fifth control signals denoted $S_3$ and $S_4$, respectively. The demultiplexers 614-616 are controlled by the three control signals denoted $S_0$, $S_1$, and $S_2$. In particular embodiments, each of the demultiplexers 614-616 distributes the output of one of the adders 610-612 to one of eight destinations each clock cycle. Four of the destinations represent outputs of the fourth stage 208. The four other destinations represent registers in one of the register banks 618-620.

As shown in FIG. 6, the fourth stage 208 receives eight input values $C_0$-$C_7$ and produces eight output values $D_0$-$D_7$. In this example, the eight input values $C_0$-$C_7$ are stored in eight registers 622, and the eight output values $D_0$-$D_7$ are stored in eight registers 624. The registers 622-624 include any hardware, software, firmware, or combination thereof for storing values. The registers 622-624 may or may not actually form part of the fourth stage 208 in the 1-D DCT processor 200. Also, in some embodiments, the registers 622 in FIG. 6 could represent the same registers 512 shown in FIG. 5.

In particular embodiments, the adder 610 in the upper portion of the fourth stage 208 is responsible for the computations represented in the upper portion of matrix D in Equation (6). Similarly, the adder 612 in the lower portion of the fourth stage 208 is responsible for the computations represented in the lower portion of matrix D in Equation (6). The function of the upper and lower portions of the fourth stage 208 is controlled by the control signals $S_0$, $S_1$, $S_2$, and $S_3$. The operations of the upper and lower portions of the fourth stage 208 are shown in Table 4 (upper portion) and Table 5 (lower portion).

TABLE 4

| $S_3$ | $S_2$ | $S_1$ | $S_0$ | Function |
|---|---|---|---|---|
| 0 | 0 | 0 | 0 | $D_0 = C_0 + C_1$ |
| 1 | 0 | 0 | 1 | $D_1 = (1/2)C_0 - (1/2)C_2$ |
| 0 | 0 | 1 | 0 | $U_0 = (1/4)C_2 + (1/8)C_2 = (3/8)C_2$ |
| 0 | 0 | 1 | 1 | $U_1 = (1/4)C_3 + (1/8)C_3 = (3/8)C_3$ |
| 1 | 1 | 0 | 0 | $U_2 = C_3 - (1/8)C_3 = (7/8)C_3$ |
| 1 | 1 | 0 | 1 | $U_3 = (7/8)C_3 - (1/64)C_3 = (55/64)C_3$ |
| 1 | 1 | 1 | 0 | $D_2 = C_2 - (3/8)C_3$ |
| 0 | 1 | 1 | 1 | $D_3 = (3/8)C_2 + (55/64)C_3$ |

TABLE 5

| $S_4$ | $S_2$ | $S_1$ | $S_0$ | Function |
|---|---|---|---|---|
| 1 | 0 | 0 | 0 | $D_4 = C_4 - (1/8)C_7$ |
| 1 | 0 | 0 | 1 | $L_0 = C_6 - (1/8)C_6 = (7/8)C_6$ |
| 0 | 0 | 1 | 0 | $D_5 = C_5 + (7/8)C_6$ |
| 0 | 0 | 1 | 1 | $L_1 = (1/2)C_6 + (1/16)C_6 = (9/16)C_6$ |
| 1 | 1 | 0 | 0 | $D_6 = (9/16)C_6 - (1/2)C_5$ |
| 0 | 1 | 0 | 1 | — |
| 0 | 1 | 1 | 0 | — |
| 0 | 1 | 1 | 1 | — |

In Tables 5 and 6, the values $U_0$ through $U_3$ and $L_0$ through $L_1$ represent intermediate values produced by the adders 610-612 and stored in the register banks 618-620. The intermediate values are then used by the adders 610-612 to generate some of the output values $D_0$ through $D_7$.

Figure 7:
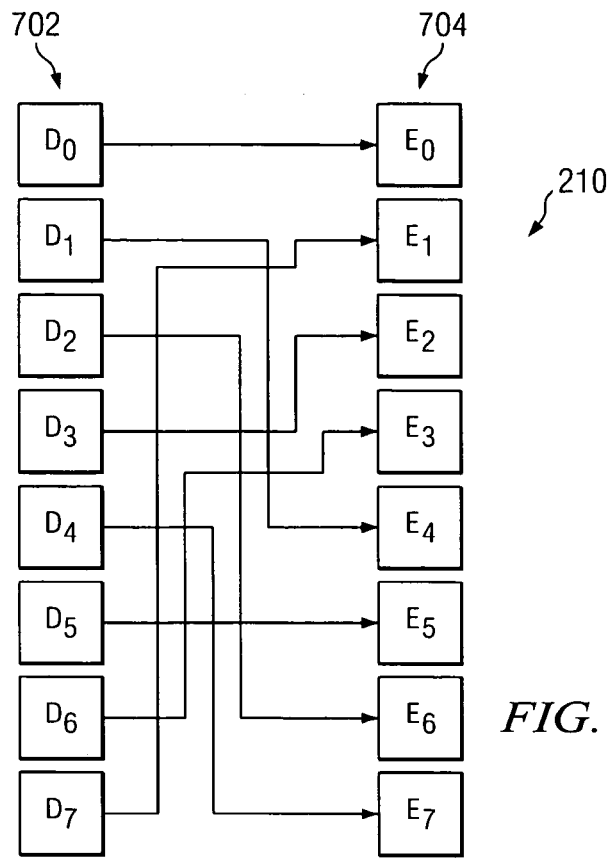
FIG. 7 illustrates an example fifth stage in a pipelined one-dimensional discrete cosine transform processor according to one embodiment of this disclosure.

FIG. 7 illustrates an example fifth stage 210 in a pipelined 1-D DCT processor 200 according to one embodiment of this disclosure. The embodiment of the fifth stage 210 shown in FIG. 7 is for illustration only. Other embodiments of the fifth stage 210 may be used without departing from the scope of this disclosure.

The fifth stage 210 is associated with matrix E in Equation (7). As shown in FIG. 7, the fifth stage 210 reorders the data output by the fourth stage 208. In this example, the fifth stage 210 receives eight input values $D_0$-$D_7$ and produces eight output values $E_0$-$E_7$. The eight input values $D_0$-$D_7$ are stored in eight registers 702, and the eight output values $E_0$-$E_7$ are stored in eight registers 704 or output as part of the output signal 214. The registers 702-704 include any hardware, software, firmware, or combination thereof for storing values. The registers 702-704 may or may not actually form part of the fifth stage 210 in the 1-D DCT processor 200. Also, in some embodiments, the registers 702 in FIG. 7 could represent the same registers 624 shown in FIG. 6. In addition, the registers 704 could be omitted.

The embodiments of the five stages 202-210 shown in FIGS. 3 through 7 represent one possible embodiment of the 1-D DCT processor 200. In particular, the embodiments of the five stages 202-210 shown in FIGS. 3 through 7 could be used in lower power applications, or applications where power consumption is an important design consideration. In these embodiments, the first stage 202 and the third stage 206 each performs eight addition operations. The second stage 204 performs four addition operations and four shift operations. The fourth stage 208 performs ten addition operations and nine shift operations. This results in a total of thirty addition operations and thirteen shift operations.

The embodiments of the four stages 202-208 shown in FIGS. 3 through 6 could also be modified for use in higher performance applications, or applications where speed is an important design consideration. For example, the four stages 202-208 could be altered to include additional adders. As a particular example, the stages 202-206 may be modified so each includes four adders, and the stage 208 may be modified to include eight adders. As shown above in Tables 1 through 3, each of the first three stages 202-206 performs between six and eight additions. Because of this, using four adders in each of these stages 202-206 results in a latency of only two clock cycles. Similarly, as shown above in Tables 4 and 5, the upper and lower portions of the fourth stage 208 perform between five and eight additions. Because of this, using eight adders (four for each portion) results in a latency of two clock cycles. Also, the fifth stage 210 may be omitted in the higher performance applications, and the fourth stage 208 may be wired such that the outputs of the fourth stage 208 can be stored column-wise in a memory and read row-wise from the memory.

Although FIGS. 2 through 7 illustrate one example of a pipelined 1-D DCT processor 200, various changes may be made to FIGS. 2 through 7. For example, the pipelined 1-D DCT processor 200 could include any number of stages. Also, other decompositions of the BinDCT structure and other embodiments of the stages 202-210 supporting those decompositions could be used in the pipelined 1-D DCT processor 200. In addition, while the use of registers and register banks has been described above, any other or additional memory devices or arrangements could be used.

Figure 8:
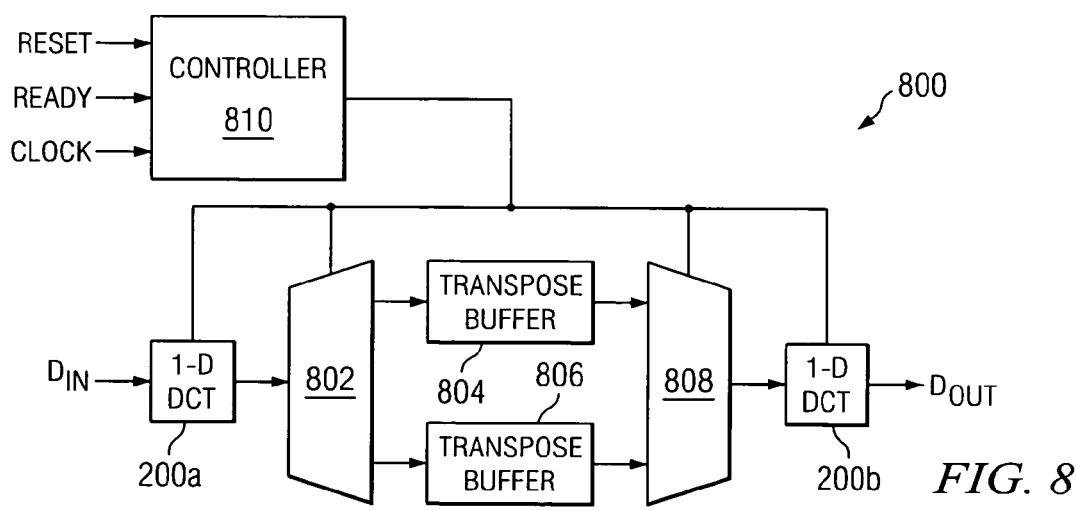
FIG. 8 illustrates an example two-dimensional discrete cosine transform processor according to one embodiment of this disclosure.

FIG. 8 illustrates an example two-dimensional (2-D) discrete cosine transform (DCT) processor 800 according to one embodiment of this disclosure. The embodiment of the 2-D DCT processor 800 shown in FIG. 8 is for illustration only. Other embodiments of the 2-D DCT processor 800 may be used without departing from the scope of this disclosure. Also, the 2-D DCT processor 800 could be used as part of the transform units 118, 134, 162 shown in FIG. 1 to implement an approximation of the discrete cosine transform or its inverse transform. The 2-D DCT processor 800 could be used in any other suitable device or apparatus.

In this example, the processor 800 uses multiple 1-D DCT processors to approximate a multi-dimensional discrete cosine transform or inverse discrete cosine transform. In this example, the 2-D DCT processor 800 includes two 1-D DCT processors 200a-200b, a demultiplexer 802, two transpose buffers 804-806, a multiplexer 808, and a controller 810. While two 1-D DCT processors 200a-200b are used in this example, more than two 1-D DCT processors could be used to provide any suitable multi-dimensional transform.

The demultiplexer 802 and the multiplexer 808 allow access by the 1-D DCT processors 200a-200b to the two transpose buffers 804-806. Each of the transpose buffers 804-806 includes any hardware, software, firmware, or combination thereof for storing values. For example, each of the transpose buffers 804-806 could store an 8×8 block containing sixty-four twelve-bit DCT coefficients.

The controller 810 controls the operation of the 2-D DCT processor 800. For example, the controller 810 may receive control signals indicating whether incoming data should be processed (the "Ready" signal) or whether the operation of the processor 800 should be initialized (the "Reset" signal). The controller 810 could also receive a clock signal used by the controller 810 and/or one or more of the other components in the processor 800. The controller 810 could further output signals used to control the other components in the processor 800, such as signals used to control the demultiplexer 802 and the multiplexer 808. The controller 810 could perform any other or additional actions in the processor 800. The controller 810 includes any hardware, software, firmware, or combination thereof for controlling the 2-D DCT processor 800.

To perform a multi-dimensional discrete cosine transform, the outputs from the 1-D DCT processor 200a are stored in the transpose buffers 804-806. Transpose operations are managed by the controller 810. For example, the controller 810 may allow data to be written row-wise into the transpose buffers 804-806 and to be read column-wise from the transpose buffers 804-806.

In one aspect of operation, the 2-D DCT processor 800 receives an input block of information, such as an 8×8 block of input data. The 2-D DCT processor 800 performs a one-dimensional discrete cosine transform using the 8×8 input block, and the results are stored in one of the transpose buffers 804-806. The results are transposed, and the 2-D DCT processor 800 performs a second one-dimensional discrete cosine transform. The 2-D DCT processor 800 then outputs an 8×8 block of DCT coefficients.

To improve the throughput of the 2-D DCT processor 800, two transpose buffers 804-806 are used. In particular embodiments, as the 1-D DCT processor 200b reads data from one of the buffers 804-806, the 1-D DCT processor 200a writes new data into the other of the buffers 804-806. After a specified period of time (such as sixty-four clock cycles), the demultiplexer 802 and the demultiplexer 808 switch buffers, allowing the 1-D DCT processors 200a-200b to access a different one of the buffers 804-806. These "ping-pong" operations may repeat until the transformation of all input data is completed.

In particular embodiments (such as those using the lower power embodiment of the 1-D DCT processor 200), the 2-D DCT processor 800 uses ten adders, eighty registers, and 384 bytes of embedded memory (the buffers 804-806). In other particular embodiments (such as those using the higher performance embodiment of the 1-D DCT processor 200), the 2-D DCT processor 800 uses forty adders, eighty registers, and 384 bytes of embedded memory.

The following represents one particular example of the operation of the 2-D DCT processor 800. This represents only an example of one embodiment of the 2-D DCT processor 800. Other embodiments of the 2-D DCT processor 800 that operate in other ways may also be used. In particular, the operation of the 2-D DCT processor 800 to implement a forward BinDCT algorithm is described below. The inverse BinDCT algorithm may be similar but represent a reverse of the process described below.

In this example embodiment, input values ($D_{in}$) in an input signal received by the processor 800 and the output values ($D_{out}$) in an output signal produced by the processor 800 are signed integers. The input values could, for example, represent 8-bit signed integers. The format of the values in both cases may be two's complement format. The processor 800 processes the input data in blocks of 8×8 values. Input data is sampled on an input port, and data is output on an output port. The ports could represent 32-bit ports capable of receiving or transmitting four 8-bit values per clock cycle. As a result, two clock cycles may be needed to load eight eight-bit input values, and sixteen clock cycles may be needed to complete the loading of an 8×8 block of eight-bit values.

The 2-D DCT processor 800 processes the input values in two stages. After computation of the discrete cosine transform for the first dimension in the first processor 200a completes, a block of sixty-four intermediate values is stored in one of the transpose buffers 804-806. The transpose buffers 804-806 may be formed by a 384-byte dual port embedded memory organized into two memory banks. Each memory bank may hold sixty-four intermediate values and serve as a buffer to transpose data from columns into rows or vice versa.

When processing for the second dimension starts, the second processor 200b retrieves the intermediate values from the first memory bank. In parallel with this processing, the first processor 200a may generate and store another set of intermediate values generated from the next 8×8 input block in the second memory bank. Later, when the second processor 200b reads and processes the intermediate values from the second memory bank, the first processor 200a generates and writes a third set of intermediate values from a third 8×8 input block into the first memory bank. These ping-pong operations repeat for the remainder of the 8×8 blocks of input data. The outputs from the second processor 200b are provided on the output port.

In the lower power embodiments, the first DCT coefficients corresponding to the first 8×8 block of input data is available on the output port 132 clock cycles after the first input value is received on the input port. In the higher performance embodiments, the first DCT coefficients are available on the output port sixteen cycles after the first input value is received on the input port. In both types of embodiments, additional output values are generated every clock cycle.

Although FIG. 8 illustrates one example of a two-dimensional (2-D) discrete cosine transform (DCT) processor 800, various changes may be made to FIG. 8. For example, while shown as two separate buffers 804-806, the buffers 804-806 could represent portions of a single memory structure.

Figure 9:
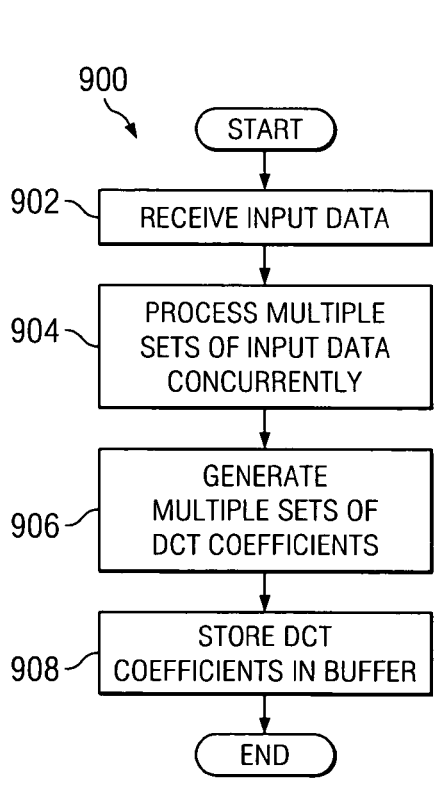
FIG. 9 illustrates an example method for fast implementation of a one-dimensional discrete cosine transform according to one embodiment of this disclosure.

FIG. 9 illustrates an example method 900 for fast implementation of a one-dimensional discrete cosine transform according to one embodiment of this disclosure. For ease of explanation, the method 900 is described with respect to the 1-D DCT processor 200 of FIG. 2. The method 900 could be used by any other suitable apparatus, device, or system.

The 1-D DCT processor 200 receives input data at step 902. This may include, for example, the 1-D DCT processor 200 receiving an input signal 212 containing the input data. The input data may originate from any source, such as the data source 108 of FIG. 1.

The 1-D DCT processor 200 processes multiple sets of input data concurrently at step 904. This may include, for example, the first stage 202 in the 1-D DCT processor 200 processing eight new input data values. This may also include each remaining stage 204-210 processing the data values provided by the corresponding prior stage 202-208, respectively. As a particular example, this may include each stage implementing part of a decomposed DCT structure, where the stages collectively implement the DCT structure. In this document, the term "concurrent" and its derivatives refer to an overlap in the performance of two or more activities, whether the overlap is complete or partial.

The 1-D DCT processor 200 generates multiple sets of DCT coefficients at step 906. This may include, for example, the last stage 210 in the 1-D DCT processor 200 generating eight DCT coefficients each clock cycle.

The 1-D DCT processor 200 stores the sets of DCT coefficients at step 908. This may include, for example, the last stage 210 in the 1-D DCT processor 200 providing the sets of DCT coefficients for storage in a memory, such as in a buffer 804 or 806.

Although FIG. 9 illustrates one example of a method 900 for fast implementation of a one-dimensional discrete cosine transform, various changes may be made to FIG. 9. For example, a similar technique may be used to implement an inverse discrete cosine transform, where DCT coefficients are converted into spatial domain values. Also, although FIG. 9 illustrates the steps of the method 900 occurring serially, various steps shown in FIG. 9 may be performed in parallel. As a particular example, all four of the steps may occur in parallel. This may occur, for example, when the 1-D DCT processor 200 is receiving enough sets of input data that each stage in the processor 200 is processing a different set of values.

Figure 10:
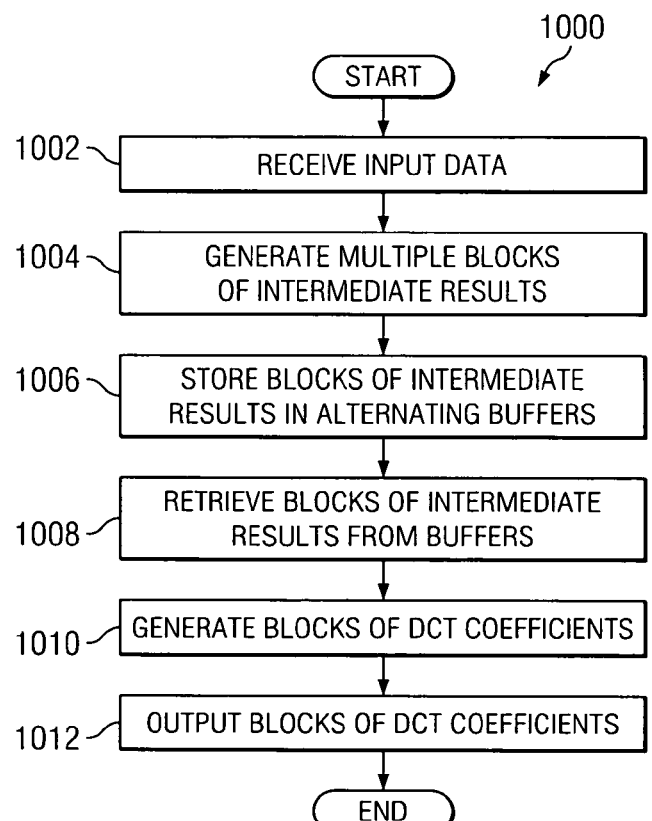
FIG. 10 illustrates an example method for fast implementation of a two-dimensional discrete cosine transform according to one embodiment of this disclosure.

FIG. 10 illustrates an example method 1000 for fast implementation of a two-dimensional discrete cosine transform according to one embodiment of this disclosure. For ease of explanation, the method 1000 is described with respect to the 2-D DCT processor 800 of FIG. 8. The method 1000 could be used by any other suitable apparatus, device, or system.

The 2-D DCT processor 800 receives input data at step 1002. This may include, for example, the 2-D DCT processor 200 receiving an input signal containing 8×8 blocks of input data. The input data may originate from any source, such as the data source 108 of FIG. 1.

The 2-D DCT processor 800 processes the input data and generates blocks of 1-D DCT coefficients at step 1004. This may include, for example, the first 1-D DCT processor 200a processing the 8×8 blocks of input data and generating 8×8 blocks of intermediate results or values. The intermediate results could, for example, represent 8×8 blocks of twelve-bit values.

The 2-D DCT processor 800 stores the blocks of intermediate results in alternating buffers at step 1006. This may include, for example, the first 1-D DCT processor 200a storing the blocks of intermediate results in two transpose buffers 804-806 in an alternating manner. The demultiplexer 802 controls which of the buffers 804-806 receives a particular block of intermediate results. This may also include the first 1-D DCT processor 200a writing the intermediate results into the buffers in a row-wise manner.

The 2-D DCT processor 800 retrieves the blocks of intermediate results from the buffers at step 1008. This may include, for example, the second 1-D DCT processor 200b receiving the intermediate results from the transpose buffers 804-806 in an alternating manner. The multiplexer 808 controls which of the buffers 804-806 provides a block of intermediate results to the second 1-D DCT processor 200b at any given time. This may also include the second 1-D DCT processor 200b reading the intermediate results from the buffers in a column-wise manner.

The 2-D DCT processor 800 generates blocks of DCT coefficients using the intermediate results at step 1010. This may include, for example, the second 1-D DCT processor 200b processing the intermediate results to produce DCT coefficients. The 2-D DCT processor 800 then outputs the blocks of DCT coefficients at step 1012.

Although FIG. 10 illustrates one example of a method 1000 for fast implementation of a two-dimensional discrete cosine transform, various changes may be made to FIG. 10. For example, a similar technique may be used to implement an inverse discrete cosine transform, where DCT coefficients are converted into spatial domain values. Also, although FIG. 10 illustrates the steps of the method 1000 occurring serially, various steps shown in FIG. 10 may be performed in parallel. As a particular example, steps 1002-1006 could be performed in parallel with steps 1008-1112. This allows, for example, intermediate results to be generated and stored in one of the buffers 804-806, while intermediate results are retrieved from another of the buffers 804-806 and further processed.

The following represents a particular simulated implementation of the lower power embodiment and the higher performance embodiment of the 1-D DCT processor 200 and the 2-D DCT processor 800. This represents only an example implementation and does not limit the scope of this disclosure.

In a particular simulated implementation, the lower power embodiments and the higher performance embodiments of the processors 200, 800 are implemented in Very high speed integrated circuit Hardware Design Language (VHDL) using 0.18 μm Complementary Metal Oxide Semiconductor (CMOS) technology. The temperature in this implementation is 125° C., the voltage is 1.55V, and the frequency is 5 MHz. For the higher performance embodiments, the implementation uses 56,578.1 μm$^2$ of combinatorial area and 58,355.7 μm$^2$ of non-combinatorial area (114,933.8 μm$^2$ total area) and has a power consumption of 24 mW. For the lower power embodiments, the implementation uses 7,778 μm$^2$ of combinatorial area and 58,216 μm$^2$ of non-combinatorial area (65,944 μm$^2$ total area) and has a power consumption of 12.05 mW. The area used by the higher performance embodiments is approximately twice that of the lower performance embodiments, but the throughput of each stage 202-210 in the higher performance embodiments may increase by 400%.

Regarding throughput, the lower power embodiments use ten adders and eighty registers. Each of the stages 202-208 has eight clock cycles to complete its computation. The computation time needed by the first 1-D DCT processor 200a when processing an 8×8 input block is equal to the cycle count for the first row plus the cycle count for the next seven rows, or (5+7)*8 or 96 cycles. The transpose buffers 804-806 require sixty-four cycles, but its execution is also pipelined. The second 1-D DCT processor 200b can begin the computation for the second dimension of the transform right after the first 1-D DCT processor 200a completes the computations for the first dimension. As a result, the number cycles to complete the 2-D BinDCT algorithm for the first 8×8 block is (12+13)*8 or 200 clock cycles. When the input data is streaming, both of the 1-D DCT processors 200a-200b may operate concurrently. The 2-D DCT processor 800 can then complete the 2-D BinDCT algorithm for each remaining 8×8 block in sixty-four cycles. The throughput of the 2-D DCT processor 800 is therefore two output values per clock cycle.

For videoconferencing applications using Quarter Common Intermediate Format (176 pixels by 144 lines at 30 frames per second), it takes 1,140,480 clock cycles to compute the forward BinDCT transformation for all Y, Cb, Cr blocks. For video in Common Intermediate Format (352 pixels by 288 lines at 30 frames per second), the total computation time is 4,561,920 cycles, which is under 5 MHz. The average power consumption of a CMOS gate due to the switching current is given by $P=\alpha C_L V_{dd}^2 f$, where f is the system clock frequency, Vdd is the supply voltage, $C_L$ is the load capacitance, and α is the switching activity. In some embodiments, the system frequency is 5 MHz, the global voltage is 1.55 V, and the total power consumption is relatively small. The 2-D DCT processor 800 is therefore an efficient design for lower power applications such as mobile multimedia applications.

For higher performance applications, the computation time of the 2-D BinDCT algorithm for the first 8×8 block is 23*2 or 46 clock cycles. When the input data is streaming, both of the 1-D DCT processors 200 operate concurrently. As a result, it takes only sixteen cycles for the 2-D DCT processor 800 to process any additional 8×8 input block. The throughput is four pixels per clock cycle, which provides a throughput of 20 Mbytes/s at 5 MHz or 120 Mbytes/s at 30 MHz. In addition, the modularity of the 1-D DCT processor 200 and the 2-D DCT processor 800 simplifies the design verification effort, and the scalability of the BinDCT algorithm provides flexibility to meet real-time constrains at different bit rates.

When implementing the 1-D DCT processor 200 or the 2-D DCT processor 800 in hardware, one issue affecting the design is the "data range." By implementing the processor 200, 800 with finite precision arithmetic, truncation errors may be introduced due to the finite length of the registers in the processor 200, 800. To reduce or eliminate the effects of truncation error, internal buses of the processor 200, 800 may be increased appropriately. However, this results in the processor 200, 800 occupying a larger area. It also may adversely affect the arithmetic models such as adders and multipliers. In some embodiments, the processor 200, 800 is designed with an optimal register length. The optimal register length helps to ensure the accuracy of the processor 200, 800 and may lead to a smaller chip area.

In the 1-D DCT processor 200, eight-bit input data may be represented in the two's complement format, ranging from −128 to 127. From the matrix factorization shown in Equations (1) through (7), it is possible to determine the output data range at each stage. For example, since the arithmetic operations in stages 202-208 are either addition or subtraction operations, the output data at each stage is one bit longer than the length of its input values in the worst case. For instance, the inputs to the stage 202 are eight-bit values, so the output of stage 202 could be a nine-bit value at most. Stage 210 has no arithmetic operation, so the input range and the output range are the same.

The relationship between the input data range and the output data range in the 1-D DCT processor 200 is summarized in Table 6.

TABLE 6

| Stage | Input Vector | Bits | Output Vector | Bits |
|---|---|---|---|---|
| 1 | f | 8 | A*f | 9 |
| 2 | A*f | 9 | B*A*f | 10 |
| 3 | B*A*f | 10 | C*B*A*f | 11 |
| 4 | C*B*A*f | 11 | D*C*B*A*f | 12 |
| 5 | D*C*B*A*f | 12 | E*D*C*B*A*f | 12 |

In the 2-D DCT processor 800, two 1-D DCT processors 200a-200b are used. The data range of the first 1-D DCT processor 200a follows that shown in Table 6. The data range of the second 1-D DCT processor 200b increases one bit for each of the stages 202-208, and the data range remains unchanged in the fifth stage 210. Since the input to the second 1-D DCT processor 200b represents twelve-bit values, the output of the second 1-D DCT processor 200b represents sixteen-bit values (one additional bit for each of the four stages 202-210). The data range for the second 1-D DCT processor 200b is summarized in Table 7.

TABLE 7

| Stage | Input Vector | Bits | Output Vector | Bits |
|---|---|---|---|---|
| 1 | f | 12 | A*f | 13 |
| 2 | A*f | 13 | B*A*f | 14 |
| 3 | B*A*f | 14 | C*B*A*f | 15 |
| 4 | C*B*A*f | 15 | D*C*B*A*f | 16 |
| 5 | D*C*B*A*f | 16 | E*D*C*B*A*f | 16 |

It may be advantageous to set forth definitions of certain words and phrases used in this patent document. The terms "include" and "comprise," as well as derivatives thereof, mean inclusion without limitation. The term "or" is inclusive, meaning and/or. The term "each" refers to every of at least a subset of the identified items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A processor, comprising:
a multi-stage pipeline comprising a plurality of stages, each stage capable of receiving input values and providing output values, each stage performing one of a plurality of data transformations using the input values to produce the output values, wherein the plurality of data transformations is selected from a first of the plurality of data transformations approximating a discrete cosine transform and a second of the plurality of data transformations approximating an inverse discrete cosine transform, wherein the plurality of stages are capable of collectively performing the selected plurality of data transformations;
wherein the stages do not use any multipliers to perform the data transformations.

2. The processor of claim 1, wherein each of one or more of the stages comprises:
a plurality of multiplexers each capable of receiving some of the input values to the stage and outputting a selected value;
an adder capable of receiving the selected values from the multiplexers and producing a combined value; and
a demultiplexer capable of providing the combined value to one of a plurality of destinations, the combined value representing one of the output values from the stage.

3. The processor of claim 2, wherein:
the multiplexers are capable of receiving first and second control signals;
the adder is capable of receiving a third control signal, the third control signal controlling whether the adder adds or subtracts the selected values to produce the combined value;
the demultiplexer is capable of receiving the first, second, and third control signals; and
the destinations comprise a plurality of inputs to a subsequent stage in the processor.

4. The processor of claim 1, wherein each of one or more of the stages comprises:
a plurality of registers capable of storing a plurality of shifted input values and a plurality of intermediate values;
a plurality of multiplexers each capable of receiving at least one of: one or more of the input values to the stage, one or more of the shifted input values, and one or more of the intermediate values, each of the multiplexers also capable of outputting a selected value;
an adder capable of receiving the selected values from the multiplexers and producing a combined value; and
a demultiplexer capable of providing the combined value to one of a plurality of destinations, the combined value representing one of the output values from the stage or one of the intermediate values.

5. The processor of claim 4, wherein each of one or more of the stages further comprises:
    a second plurality of registers capable of storing a second plurality of shifted input values and a second plurality of intermediate values;
    a second plurality of multiplexers each capable of receiving at least one of: one or more of the input values to the stage, one or more of the second shifted input values, and one or more of the second intermediate values, each of the second multiplexers also capable of outputting a second selected value;
    a second adder capable of receiving the second selected values from the second multiplexers and producing a second combined value; and
    a second demultiplexer capable of providing the second combined value to one of a second plurality of destinations, the second combined value representing one of the output values from the stage or one of the second intermediate values.

6. The processor of claim 1, wherein at least one of the stages is capable of reordering the input values to produce the output values without performing any arithmetic operations using the input values.

7. The processor of claim 1, wherein one of:
    the input values to one of the stages comprise pixel values and the output values from another of the stages comprise discrete cosine transform coefficients; and
    the input values to one of the stages comprise discrete cosine transform coefficients and the output values from another of the stages comprise pixel values.

8. A multi-dimensional processor, comprising:
    a plurality of processing units, each of one or more of the processing units comprising a multi-stage pipeline having a plurality of stages, each stage capable of receiving input values and providing output values, each stage performing one of a plurality of data transformations using the input values to produce the output values, wherein the plurality of data transformations is selected from a first of the plurality of data transformations approximating a discrete cosine transform and a second of the plurality of data transformations approximating an inverse discrete cosine transform, wherein the plurality of stages are capable of collectively performing the selected plurality of data transformations, the stages not using any multipliers to perform the data transformations; and
    at least one memory capable of storing intermediate values output by one of the processing units and providing the intermediate values as input to another of the processing units.

9. The multi-dimensional processor of claim 8, wherein each of one or more of the stages comprises:
    a plurality of multiplexers each capable of receiving some of the input values to the stage and outputting a selected value;
    an adder capable of receiving the selected values from the multiplexers and producing a combined value; and
    a demultiplexer capable of providing the combined value to one of a plurality of destinations, the combined value representing one of the output values from the stage.

10. The multi-dimensional processor of claim 8, wherein each of one or more of the stages comprises:
    a plurality of registers capable of storing a plurality of shifted input values and a plurality of intermediate values;
    a plurality of multiplexers each capable of receiving at least one of: one or more of the input values to the stage, one or more of the shifted input values, and one or more of the intermediate values, each of the multiplexers also capable of outputting a selected value;
    an adder capable of receiving the selected values from the multiplexers and producing a combined value; and
    a demultiplexer capable of providing the combined value to one of a plurality of destinations, the combined value representing one of the output values from the stage or one of the intermediate values.

11. The multi-dimensional processor of claim 10, wherein each of one or more of the stages further comprises:
    a second plurality of registers capable of storing a second plurality of shifted input values and a second plurality of intermediate values;
    a second plurality of multiplexers each capable of receiving at least one of: one or more of the input values to the stage, one or more of the second shifted input values, and one or more of the second intermediate values, each of the second multiplexers also capable of outputting a second selected value;
    a second adder capable of receiving the second selected values from the second multiplexers and producing a second combined value; and
    a second demultiplexer capable of providing the second combined value to one of a second plurality of destinations, the second combined value representing one of the output values from the stage or one of the second intermediate values.

12. The multi-dimensional processor of claim 8, wherein at least one of the stages is capable of reordering the input values to produce the output values without performing any arithmetic operations using the input values.

13. The multi-dimensional processor of claim 8, wherein:
    the at least one memory comprises a plurality of buffers; and
    a first of the processing units writes a first set of intermediate results to one of the buffers while a second of the processing units reads a second set of intermediate results from another of the buffers.

14. The multi-dimensional processor of claim 13, further comprising:
    a demultiplexer capable of allowing the first processing unit to access a selected one of the buffers;
    a multiplexer capable of allowing the second processing unit to access a second selected one of the buffers; and
    a controller capable of controlling the multiplexer and the demultiplexer.

15. A method, comprising:
    receiving an input signal by a processor;
    transforming the input signal, by the processor, into an output signal by performing a sequence of data transformations in a multi-stage pipeline, each data transformation transforming input values into output values, wherein the sequence of data transformations is selected from a first of the plurality of data transformations approximating a discrete cosine transform and a second of the plurality of data transformations approximating an inverse discrete cosine transform, wherein the sequence of data transformations is capable of collectively performing the selected first or second plurality of data transformations, the data transformations performed in the multi-stage pipeline without using any multipliers; and
    outputting, by the processor, the output signal.

16. The method of claim 15, wherein each of one or more of the data transformations comprises:
- selecting a subset of the input values;
- combining the selected values to produce a combined value; and
- providing the combined value to one of a plurality of destinations, the combined value representing one of the output values.

17. The method of claim 15, wherein each of one or more of the data transformations comprises:
- storing a plurality of shifted input values and a plurality of intermediate values;
- selecting a subset of the input values, the shifted input values, and the intermediate values;
- combining the selected values to produce a combined value; and
- providing the combined value to one of a plurality of destinations, the combined value representing one of the output values or one of the intermediate values.

18. The method of claim 15, wherein each of one or more of the data transformations comprises reordering the input values to produce the output values without performing any arithmetic operations using the input values.

19. The method of claim 15, wherein transforming the input signal comprises performing a sequence of data transformations in each of a plurality of multi-stage pipelines.

20. The method of claim 19, wherein transforming the input signal comprises:
- generating intermediate values by transforming the input signal using a first of the multi-stage pipelines;
- storing the intermediate values in a memory;
- retrieving the intermediate values from the memory for a second of the multi-stage pipelines; and
- generating the output signal by transforming the intermediate values using the second of the multi-stage pipelines.

21. A method for operating a processor, the method comprising:
- decomposing, by the processor, into a product of a plurality of matrices, a matrix, the matrix capable of representing an approximation of a discrete cosine transform and an inverse discrete cosine transform; and
- mapping the plurality of matrices to a plurality of stages of a multi-stage pipeline, each of the plurality of stages capable of performing one of a plurality of data transformations, the data transformations collectively approximating at least one of: the discrete cosine transform and the inverse discrete cosine transform.

* * * * *